(12) United States Patent
Canuto

(10) Patent No.: US 9,630,282 B2
(45) Date of Patent: Apr. 25, 2017

(54) INTERFACE STRUCTURE

(71) Applicant: Almerino Canuto, Casale Sul Sile (IT)

(72) Inventor: Almerino Canuto, Casale Sul Sile (IT)

( * ) Notice: Subject to any disclaimer, the term of this patent is extended or adjusted under 35 U.S.C. 154(b) by 32 days.

(21) Appl. No.: 14/418,267

(22) PCT Filed: Apr. 5, 2013

(86) PCT No.: PCT/EP2013/057198
§ 371 (c)(1),
(2) Date: Jan. 29, 2015

(87) PCT Pub. No.: WO2014/023442
PCT Pub. Date: Feb. 13, 2014

(65) Prior Publication Data
US 2015/0190895 A1  Jul. 9, 2015

(30) Foreign Application Priority Data

Aug. 6, 2012  (IT) ............... TV2012U0033

(51) Int. Cl.
*B23Q 3/00* (2006.01)
*B23Q 1/00* (2006.01)
*B23Q 3/10* (2006.01)

(52) U.S. Cl.
CPC .......... *B23Q 1/0072* (2013.01); *B23Q 3/103* (2013.01)

(58) Field of Classification Search
CPC ............... B23Q 1/0072; B23Q 3/103
See application file for complete search history.

(56) References Cited

U.S. PATENT DOCUMENTS

2003/0071407 A1* 4/2003 Haruna ............... B23Q 1/0081
269/309

FOREIGN PATENT DOCUMENTS

| DE | 19805165 A1 | 8/1999 |
| DE | 10317342 A1 | 11/2004 |
| EP | 1346794 A1 | 9/2003 |

OTHER PUBLICATIONS

Machine Translation of DE 198 05 165 A1 by Stark.*
International Search Report for corresponding application PCT/EP2013/057198 filed Apr. 5, 2013; Mail date Jul. 5, 2013.
Written Opinion for corresponding application PCT/EP2013/057198 filed Apr. 5, 2013; Mail date Jul. 5, 2013.

* cited by examiner

*Primary Examiner* — Larry E Waggle, Jr.
*Assistant Examiner* — Nirvana Deonauth
(74) *Attorney, Agent, or Firm* — Cantor Colburn LLP

(57) ABSTRACT

An interface structure that is constituted by a first, U-shaped toothed pivot, which can be associated in an upper region, by way of a jaw connection, with a fixing element with the interposition of a first bush for centering. The first toothed pivot is rendered axially integral in a lower region with a fastening element that can be associated with an underlying device for compensating the misalignment in automatic locking systems for the mounting of blanks.

12 Claims, 5 Drawing Sheets

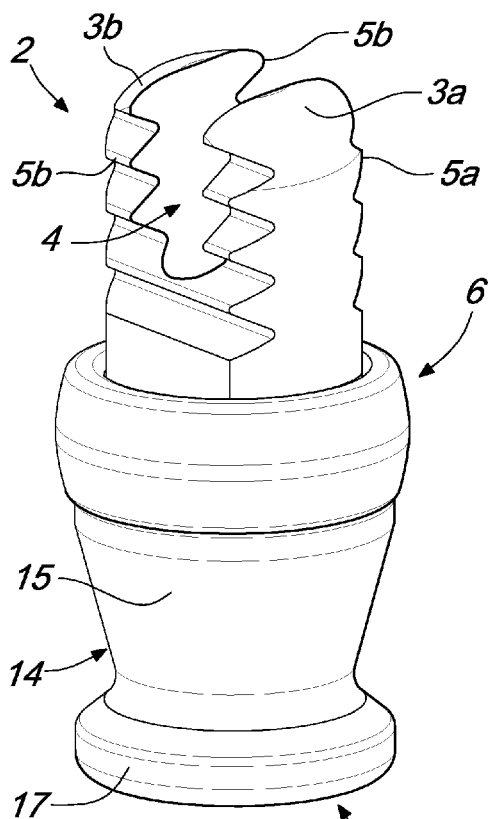
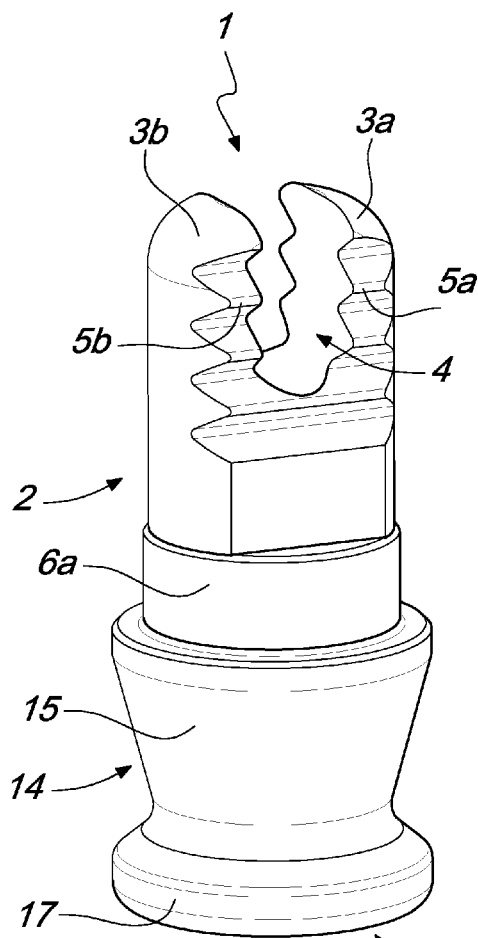
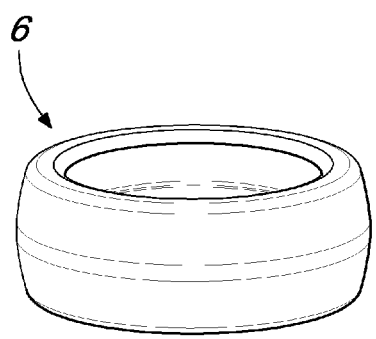
Fig. 2
Fig. 3
Fig. 4

INTERFACE STRUCTURE

The present application relates to an interface structure.

Today European patent EP1346794B1 is known which relates to a modular structure, particularly for mounting blanks on retainers, which addresses the problem that arises when certain operations need to be carried out, such as for example painting, cleaning and assembly, or the execution of various different forms of working, such as for example removing shavings, which require the locking of the piece and/or blank in a preset position for the treatment thereof.

Thus devices are known which are indispensable whenever the stable locking of an object to be treated by way of generic and even simple operations, not necessarily in a purely industrial setting, is required.

A significant drawback, which is complained of in conventional devices, lies in the fact that in order to achieve a stable locking of the piece it is necessary to bring both of the spacing elements of the locking device in contact with two opposite side faces of the same piece.

In this manner the possibility is thus ruled out of executing any work at those side faces, which, since they are affected by the contact, have no free surfaces to allow contact with the tool or, more generally, with the component of any machine tool.

It follows from this that one has to subsequently remove the piece, positioning it according to a new orientation which is such as to allow the exposure of the two side surfaces which were earlier partially concealed by the locking elements.

A further aggravating factor of the above problem consists in that, during the locking of the piece, the latter has at least three surfaces at which no work can be performed, the third surface, in addition to the side surfaces adjacent to the locking elements, being the lower one, which is entirely resting on the work surface of the machine tool.

The necessity follows from this that one has to resort to multiple successive positionings and associated lockings of the piece, with the further aggravating factor of possibly repeatedly making systematic positioning errors, which thus have a negative effect on the precision that can be achieved overall at the end of work on the piece.

Another drawback of devices lies in the necessity to avail of qualified labor in order to be able to perform the delicate preliminary operations of positioning and centering the piece.

An additional drawback, which often recurs in conventional locking devices, consists in possibly damaging the piece by local deformation, at the surfaces that have already been worked and are subsequently subjected to contact with the brackets, in order to allow the working of surfaces of the piece which have not yet been treated.

A significant problem, in addition to those mentioned above, relates to the considerable expenditure of time caused by repeated, successive operations to unlock, reposition and relock a piece that is intended to receive some form of treatment at a plurality of surfaces.

In a partial solution to such drawbacks, EP1346794B1 claims a modular structure, for mounting, on retainers, blanks having at least one seat, the modular structure comprising at least one flat plate that has a plurality of first seats for detachable connection of first fixing means for at least one first body and second temporary fixing means allowing detachable connection of the first body to the blank, the second temporary fixing means allowing connection of the modular structure at the seat formed in the blank and further comprising a first centering bush for the automatic centering of the first body with respect to the first seat, the first bush having a first portion which is connectable in the first seat and a second frustum-shaped upper portion which has an approximately frustum-shaped outer perimetric surface that protrudes above the plate once the connection between the first seat and the bush has been achieved. The second frustum-shaped upper portion has a lower surface directly in contact with an upper surface of the flat plate; the first means for fixing the first body to the plate comprise a first traction element for connection between the first seat and the first body and a first vise-like device, which is associated with the first body, so as to temporarily lock the first traction element. The first body, which is cylindrical, has a second axial hole for the partial containment of the first and/or second traction elements, and comprises, in a lower region, a third through hole that is formed radially and is meant to accommodate the first vise-like device, the third hole affecting the second axial hole approximately at right angles. The first vise-like device is constituted by a pair of first jaws, which can be accommodated inside the third hole and are arranged mirror-symmetrically in mutually diametrically opposite positions, and the first jaws, which are substantially cylindrical, are mutually associable by way of activation means, which are constituted by a first screw, which is arranged coaxially to a fourth hole and a fifth hole which are through holes and are formed axially along the pair of first jaws.

This solution, although solving the above-mentioned problems, also has drawbacks in that it has been found that in the parts to be fixed, and thus in the blanks (designated with 50 in EP1346794B1), a first threaded hole (designated with 36 in EP1346794B1) is obtained for a fastening element (such as a threaded shank, designated with 39a in EP1346794B1) and thus a first seat (designated with 34 in EP1346794B1) for a centering bush (designated with 37 in EP1346794B1): in the course of the production process of the part to be fixed, some working steps can cause the geometric shape of the piece to vary, since the first seat may subsequently be recentered with a greater size and in the best adapted position for the centering of the part (slightly shifted from the previous one).

It follows from this that the diameters of the first hole and of the first seat do not have the same axis.

The same applicant, in a partial solution to the above-mentioned problems, filed, on Nov. 7, 2012, Italian application no. TV2012A000129 relating to a device for compensating the misalignment in automatic locking systems for mounting, on retainers, blanks which have a first hole, for a fastening element, at the end of which a first seat for a centering bush is provided. The device is constituted by a box-like body composed of a T-shaped hollow body and by a U-shaped base which form an inner seat for a truncated pyramid shaped jacket, arranged coaxially at the shank of the hollow body and above a piston, having the capability to move transversely with respect to the shank. A traction element is slideably arrangeable in the shank of the hollow body and axially integral with the fixing element and with which the centering bush is coaxially associated in an upper region and can be arranged at the first seat which has a diameter that exceeds the diameter of the first fixing hole and is provided eccentrically with respect to the latter. The traction element selectively cooperates with spheres that can be accommodated inside adapted openings provided in the shank and inside adapted second seats which are provided in the jacket. Between the head of the hollow body and the jacket elastically compressible elements are provided, means being present for allowing a temporary axial movement of the piston.

Such solution, differently from the known art explained in which there is a mechanical interconnection of the various components which are mutually axially arrangeable in a stable condition, makes it possible, thanks to the presence of the piston, to achieve an adjustment of the position through the use of pneumatic means which are allowed to perform an axial movement with respect to the various components.

Such solution has been provided in order to enable the fixing both of pieces and of pallets, which are handled in automated environments.

Although such two solutions make it possible to position and stably lock the pieces on the platform of any machine tool so as to perform the desired workings, it has been found that the two solutions must be usable separately: the first for manually locking pieces and the second for automatically locking them.

The two solutions cannot be used in conjunction on the same platform, owing to their mechanical diversity, which makes them incompatible.

The main aim of the present invention is therefore to solve the above-mentioned technical problems, eliminating the drawbacks in the cited known art and hence providing an interface structure that makes it possible to use, in conjunction and on the same platform, both of the solutions explained above for the purpose of achieving the centering and the stable fixing of pieces to be worked on the platform of any machine tool while at the same time being able to vary both the height of positioning of the pieces and that of the pallets on which they are to be positioned.

Another object of the invention is to provide an interface structure that, in addition to the foregoing characteristics, is also low-cost and can be implemented with usual and conventional machinery and plants.

This aim and these and other objects which will become more apparent hereinafter are achieved by an interface structure 1, characterized in that it is constituted by a first, U-shaped toothed pivot 2, which can be associated in an upper region, by way of a jaw connection, with a means of fixing 7 with the interposition of a first bush 6 for centering, said first toothed pivot 2 being axially integral in a lower region with a fastening element 14 that can be associated with an underlying device 18 for compensating the misalignment in automatic locking systems for the mounting of blanks.

Further characteristics and advantages of the invention will become more apparent from the detailed description of a particular, but not exclusive, embodiment, illustrated by way of non-limiting example in the accompanying drawings wherein:

FIG. 2 is a three-quarters view from the side of the invention;

FIG. 3 is a three-quarters view from the side of the invention without the bush;

FIG. 4 is a three-quarters view from the side of the bush that can be associated coaxially with the first pivot;

Figure 1:
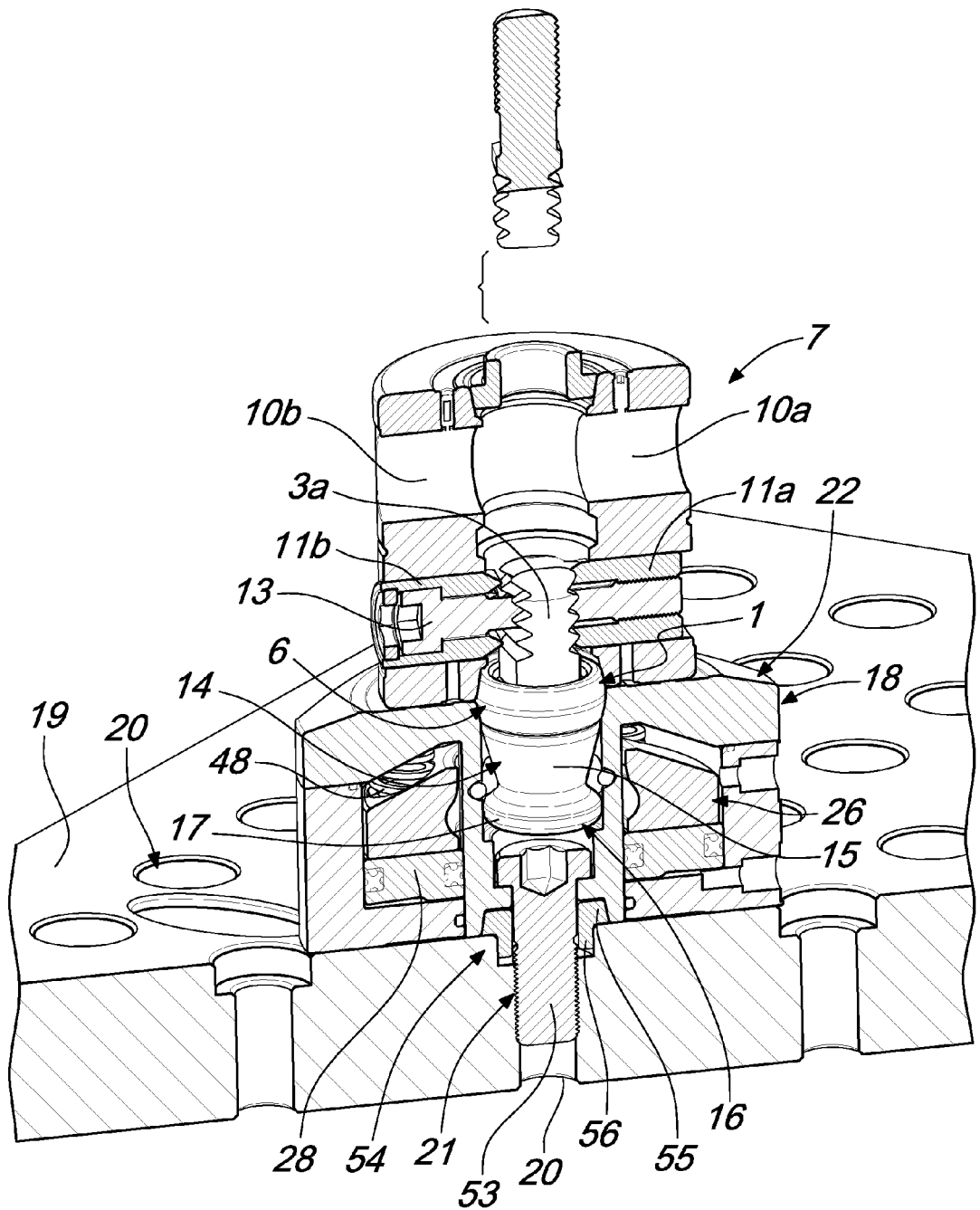
FIG. 1 is a three-quarters view from the side, plus an exploded view, of the invention associated both with a means of fixing and with a device for compensating the misalignment in automatic locking systems for the mounting of blanks.
Figure 5:
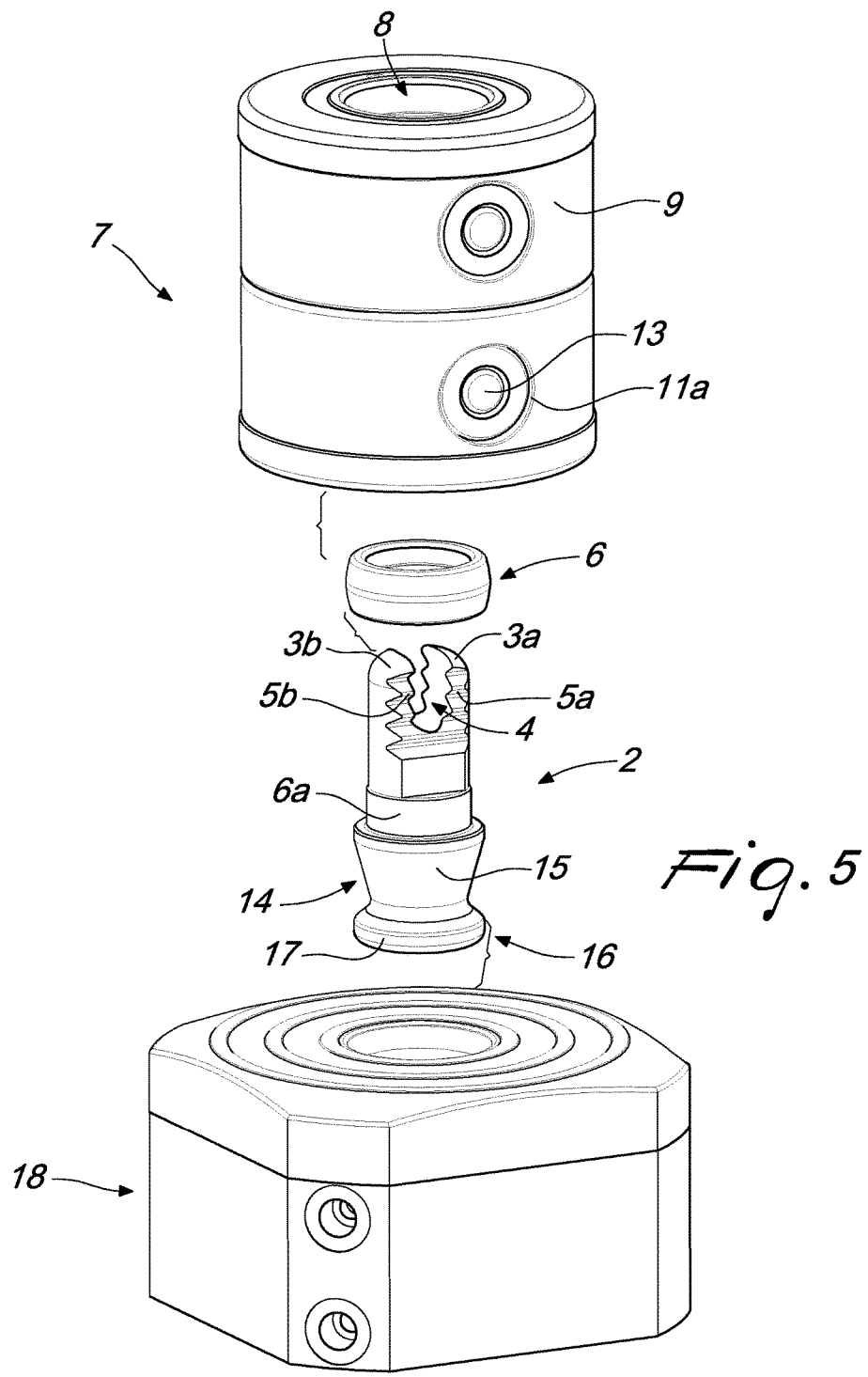
FIG. 5 is an exploded view of the invention and the means of fixing and the device for compensating the misalignment in automatic locking systems for the mounting of blanks.
Figure 6:
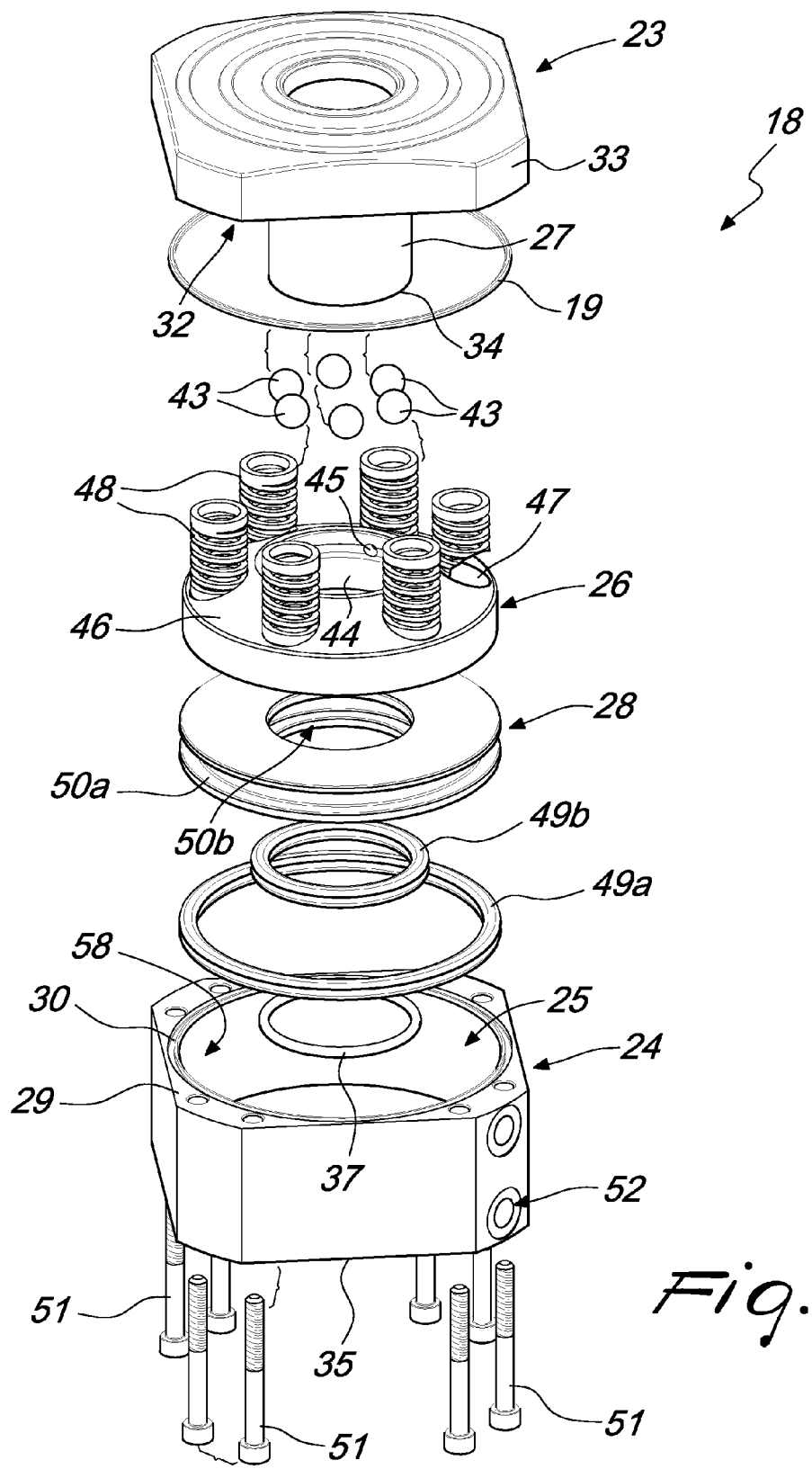
FIG. 6 is an exploded view of the device for compensating the misalignment in automatic locking systems for the mounting of blanks.
Figure 7:
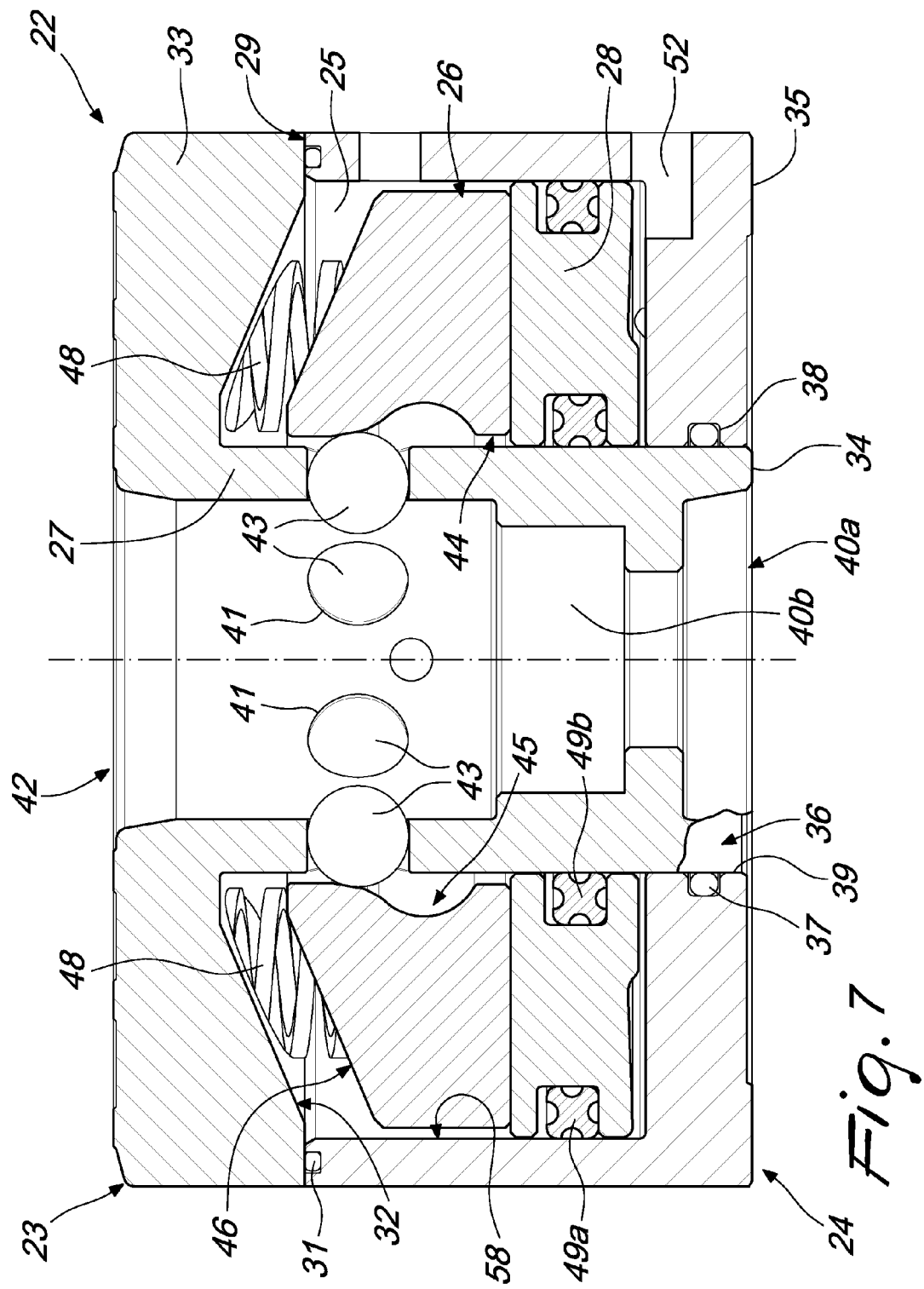
FIG. 7 is a diametrical sectional view of the device for compensating the misalignment in automatic locking systems for the mounting of blanks.

In the embodiments illustrated, individual characteristics shown in relation to specific examples may in reality be interchanged with other, different characteristics, existing in other embodiments.

With reference to the figures, the reference numeral 1 generally designates an interface structure that is constituted by a first U-shaped pivot 2 so as to define a first wing 3a and a second wing 3b between which an opening 4 is defined.

At the side surfaces of each one of the first wing 3a and the second wing 3b there is a series of teeth 5a and 5b that protrude on the same plane. A first centering bush 6, which is cylindrical with an external profile with a double taper, can be inserted axially onto the first pivot 2 and can be arranged in a stable condition below the side surfaces of each one of the first wing 3a and the second wing 3b, and at an annular ridge 6a.

The first pivot 2 can be associated with a means of fixing 7 constituted by a pair of cylindrical elements, which are identical and mutually coupled, each one of which is provided with a first axial hole 8, and transversely to the side surface 9 of each one of which, along the same axis, two first seats 10a and 10b for means of jaw coupling with the first pivot 2 are provided.

The function of the first bush 6 is, thanks to the double taper, to enable an adaptation of the position of the means of fixing 7 with respect to the first pivot 2.

The jaw coupling means are constituted by two barrels 11a and 11b which are slidingly associable inside the first seats 10a and 10b and at one end of which a complementary toothing 12a and 12b is provided which is adapted to engage the series of teeth 5a and 5b.

The clamping of the two barrels 11a and 11b occurs by way of an adapted screw 13.

Below the first bush 6, the first pivot 2 is rendered axially integral in a lower region with a fastening element 14 that is constituted by a traction element provided with a conical body 15 the end tip 16 of which, which is directed away from the first pivot 2, has an expansion 17.

The fastening element 14 is associable with an underlying device 18 for compensating the misalignment in automatic locking systems for the mounting of blanks to a plate 19, the plate 19 being provided with a series of threaded second holes 20, which are seats for a second pivot 21 which comprises a complementary threaded first shank 53 coaxially to which a second centering bush 54 is arranged.

The second centering bush 54 has a frustum-shaped upper portion 55 and a cylindrical lower portion 56.

A similar third bush 57 is arranged at the end of the means of fixing 7 which does not interact with the first pivot 2.

The second pivot 21 enables the interconnection of the device 18 and the plate 19.

The device 18 is constituted by a box-like body 22 that is composed of a T-shaped hollow body 23 and by a U-shaped base 24 which form a second, inner seat 25 for a truncated pyramid shaped jacket 26 that is arranged coaxially to the second shank 27 of said hollow body 23 and above a piston 28 with the possibility of transverse movement with respect to said second shank 27.

At the upper surface 29 of the base 24 there is a first annular groove 30 which acts as a seat for a first gasket 31 that is adapted to provide a seal at the lower perimetric edge 32 of the head 33 of the hollow body 23.

The length of the second shank 27 is such that its lower end 34 is positioned substantially at the plane of arrangement of the lower surface 35 of the base 24.

The base 24 has, at the lower surface 34, a second hole 36 within which the lower end 34 of the second shank 27 of the hollow body 23 operates.

A second gasket 37 is also present which can be arranged at a second annular groove 38 that is formed in the first wall 39 of the hollow body 23, which is formed by the second hole 36.

Proximate to the lower end 34 of the hollow body 23, there is a third seat 40a, for the second centering bush 54, which is contiguous with an additional seat 40b for the head of the second pivot 21.

In the second shank 27 of the hollow body 23 there are adapted openings 41 which are substantially circular in plan view and arranged on a same plane which is transverse to the second shank 27.

Such openings 41 are provided proximate to the open upper end 42 of the hollow body 23.

Adapted spheres 43 are selectively arrangeable inside the openings 41 and do not have the possibility of falling into the second shank 27.

The truncated pyramid shaped jacket 26 is axially perforated in order to permit the passage of the shank 27 of the hollow body 23, the jacket 26 being provided with a second wall 44, facing toward the second shank 27, in which fourth seats 45 are provided.

Such spheres 43 can be selectively accommodated within the fourth seats 45 when the fourth seats 45 are arranged on the same plane on which the openings 41 are formed in the second shank 27 of the hollow body 23.

Between the head 33 of the hollow body 23 and the upper surface 46 of the jacket 26 there are fifth seats 47 for elastically compressible elements 48 such as cylindrical compression springs.

The jacket 26 is of such size as to be capable of being subjected to a transverse movement inside the inner seat 25 of the box-like body 22; the jacket 26 is thus able to perform a movement with respect to the second shank 27 in the sense that its second wall 44 can move toward or away from the second shank 27.

The piston 28 is constituted by a pulley-shaped element which is arranged in the space between the second shank 27 of the hollow body 23 and the inner side surface 58 of the base 23.

The seal is made possible by the presence of a pair of third gaskets 49a and 49b which are provided at complementarily shaped third annular grooves 50a and 50b.

The pair of third gaskets forms means that are adapted to enable a temporary axial movement of the piston.

Adapted screws 51 are provided which are adapted to mutually fasten and fix the base 24 and the hollow body 23.

In the operation of the device 18, initially it is filled, at an adapted first channel 52 that is provided proximate to the lower surface 35 of the base 24, with air under pressure which affects the part of the inner seat 25 of the box-like body 22 underlying the piston 28.

The air lifts the piston 28 and as a consequence also the jacket 26, thus compressing the elastically compressible elements 48.

In this manner the spheres 43 are free to move inside the openings 41 and thus also toward the fourth seats 45.

At this point the fastening element 14 of the first pivot 2 is inserted into the box-like body 22 through the open upper end 42 of the hollow body 23 until the end tip 16 and thus the expansion 17 is positioned at or slightly below the openings 41 which are provided in the second shank 27.

When the air pressure is released, the elastically compressible elements 48 push the jacket 26 and the piston 28 downward: in this manner the spheres 43 are pushed by the jacket 26 so as to exit from the fourth seats 45 and thus exit slightly from the second openings 41 so as to affect the connection zone between the conical body 15 and the end tip 16.

In this manner the fastening element 14 is placed in downward traction.

Since the jacket 26 can move horizontally, it follows from this that the misalignment of the fastening element 14 with respect to the first centering bush 6 can be accepted.

The possibility offered to the jacket 26 of moving in the inner seat 25 and thus with respect to the second shank 27 of the hollow body 23 makes it possible to accept such misalignment, by compensating it.

In practice it has been found that the invention has fully achieved the intended aim and objects, an interface structure having been obtained that can be used on the same platform, both for manually locking both pieces and pallets, and for achieving such locking automatically.

Naturally the materials used as well as the dimensions of the individual components of the invention may be more pertinent to specific requirements.

The various means of achieving certain different functions certainly need not coexist only in the embodiment shown, but may be present in many embodiments, even if they are not shown.

The characteristics indicated above as advantageous, convenient or similar, may also be missing or be substituted by equivalent characteristics.

The disclosures in Italian Patent Application No. TV2012U000033 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. An interface structure, comprising: a first, U-shaped toothed pivot, a means of fixing, a first bush for centering, a fastening element, an underlying device for compensating misalignments in automatic locking systems for mounting of blanks, wherein the first toothed pivot is connected in an upper region, by way of a jaw connection, with the means of fixing with the interposition of the first bush for centering, wherein the first toothed pivot is axially integral in a lower region with the fastening element that is connected with the underlying device for compensating the misalignments in automatic locking systems for the mounting of blanks, and wherein said first, U-shaped pivot has a first wing and a second wing between which an opening is defined, at side surfaces of each one of said first wing and second wing there being a series of teeth that protrude on the same plane, wherein the first bush for centering, which is cylindrical with an external profile with a double conical taper, is inserted axially onto said first pivot and is arranged in a stable condition below said side surfaces of each one of said first wing and said second wing, and at an annular ridge.

2. The structure according to claim 1, wherein the double taper of said first bush enables an adaptation of a position of said means of fixing with respect to said first pivot.

3. The structure according to claim 1, wherein below said first bush, said first pivot is rendered axially integral in the lower region with said fastening element that comprises a traction element provided with a conical body, an end tip of which, which is directed away from said first pivot, has an expansion, wherein said fastening element is connected with the underlying device for compensating the misalignments in automatic locking systems for the mounting of blanks to a plate, the plate being provided with a series of threaded second holes, which are seats for a second pivot which comprises a complementary threaded first shank coaxially to which a second centering bush is arranged which has a frustum-shaped upper portion and a cylindrical lower portion.

4. The structure according to claim 1, wherein said means of fixing comprises a pair of cylindrical elements, which are identical and mutually coupled, each one of which is provided with a first axial hole, and transversely to a side surface of each one of which, along a same axis, two first seats for means of jaw coupling with said first pivot are provided, wherein said jaw coupling means comprises two barrels which are slidingly associable inside said first seats and at one end of which a complementary toothing is provided which is adapted to engage said series of teeth, a clamping of said two barrels occurring by way of an adapted screw.

5. The structure according to claim 1, wherein said device is comprises a box-like body that is composed of a T-shaped hollow body and by a U-shaped base which form a second, inner seat for a truncated pyramid shaped jacket that is arranged coaxially to a second shank of said hollow body and above a piston with the possibility of transverse movement with respect to said second shank, at an upper surface of said base a first annular groove being provided which acts as a seat for a first gasket that is adapted to provide a seal at the lower perimetric edge of a head of the hollow body, the length of said second shank being such that a lower end of said second shank is positioned substantially at a plane of arrangement of a lower surface of said base which has, in a lower surface, a second hole within which said lower end of said second shank of said hollow body operates.

6. The structure according to claim 5, further comprising a second gasket which can be arranged at a second annular groove that is formed in a first wall of said hollow body, which is formed by said second hole, proximate to the lower end of said hollow body, a third seat being provided, for said second centering bush, which is contiguous with an additional seat for the head of said-a second pivot, in said second shank of said hollow body adapted openings being provided which are substantially circular in plan view and which are arranged at a same plane which is transverse to said second shank, said openings being provided proximate to an open upper end of said hollow body, spheres being selectively arrangeable inside said openings and not having the possibility of falling into said second shank.

7. The structure according to claim 5, wherein said truncated pyramid shaped jacket is axially perforated in order to permit passage of said second shank of said hollow body, said jacket being provided with a second wall, facing toward said second shank, in which fourth seats are provided, spheres being capable of being selectively accommodated within said fourth seats when said fourth seats are arranged on a same plane on which openings are formed in said second shank of said hollow body, between the head of said hollow body and an upper surface of said jacket fifth seats for elastically compressible elements.

8. The structure according to claim 7, wherein said jacket is of such size as to be capable of being subjected to a transverse movement inside said inner seat of said box-like body, said jacket being able to perform a movement with respect to said second shank in the sense that the second wall of said jacket can move toward or away from said second shank.

9. The structure according to claim 6, wherein said piston by comprises a pulley-shaped element which is arranged in a space between said second shank of said hollow body and an inner side surface of said base, the seal being made possible by the presence of a pair of third gaskets which are provided at complementarily shaped third annular grooves, said pair of third gaskets forming means that are adapted to enable a temporary axial movement of said piston.

10. The structure according to claim 7, wherein said device, at a first channel that is provided proximate to the lower surface of said base, can be filled with air under pressure which affects a part of the inner seat of said box-like body underlying said piston, said air lifting said piston and as a consequence also said jacket, thus compressing said elastically compressible elements, in this manner said spheres being free to move inside said openings and thus also toward said fourth seats so that said fastening element of said first pivot is inserted into said box-like body through an open upper end of said hollow body until an end tip and thus an expansion is positioned at or slightly below said openings which are provided in said second shank.

11. The structure according to claim 7, wherein upon releasing an air pressure, said elastically compressible elements press said jacket and said piston downward so that said spheres are pushed by said jacket so as to exit from said fourth seats and thus exit slightly from said second openings so as to affect a connection zone between a conical body and an end tip, thus applying traction to said fastening element.

12. The structure according to claim 5, wherein said jacket can move horizontally in accepting a misalignment of said fastening element with respect to said first centering bush.

* * * * *